(12) United States Patent
Billhartz

(10) Patent No.: US 6,894,985 B2
(45) Date of Patent: May 17, 2005

(54) MONITORING LINK QUALITY IN A MOBILE AD HOC NETWORK

(75) Inventor: Thomas Jay Billhartz, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 148 days.

(21) Appl. No.: 10/212,348

(22) Filed: Aug. 5, 2002

(65) Prior Publication Data

US 2004/0022223 A1 Feb. 5, 2004

(51) Int. Cl.$^7$ ................................................ H04Q 7/20
(52) U.S. Cl. ....................... 370/252; 370/338; 370/349; 714/704
(58) Field of Search ................................ 370/400, 252, 370/329, 338, 216, 217, 231, 235, 238, 253, 349, 389; 714/1, 2, 704

(56) References Cited

U.S. PATENT DOCUMENTS

| | | | |
|---|---|---|---|
| 5,375,123 A | * 12/1994 | Andersson et al. | 370/333 |
| 5,412,654 A | 5/1995 | Perkins | 370/94.1 |
| 5,987,011 A | 11/1999 | Toh | 370/331 |
| 6,304,556 B1 | 10/2001 | Haas | 370/254 |
| 6,385,174 B1 | 5/2002 | Li | 370/252 |
| 2001/0033556 A1 | 10/2001 | Krishnamurthy et al. | 370/329 |
| 2002/0013856 A1 * | 1/2002 | Garcia-Luna-Aceves et al. | 709/238 |
| 2002/0039357 A1 * | 4/2002 | Lipasti et al. | 370/338 |
| 2003/0120809 A1 * | 6/2003 | Bellur et al. | 709/239 |

OTHER PUBLICATIONS

Mirhakkak et al., *Dynamic Quality-of-Service for Mobile Ad Hoc Networks*, MITRE Corp., 2000.

Van Dyck et al., *Distributed Sensor Processing Over an Ad–Hoc Wireless Network: Simulation Framework And Performance Criteria*, Proceedings IEEE Milcom, Oct. 2001.

Zhu, *Medium Access Control and Quality-of-Service for Mobile Ad Hoc Networks*, PHD Thesis, Department of Computer Engineering, University of Maryland, College Park, MD, 2001.

Royer et al., *A Review of Current Routing Protocols for Ad Hoc Mobile Wireless Networks*, IEEE Personal Communications, Apr. 1999, pp. 46–55.

Corson et al., *A Reservation–Based Multicast (RBM) Routing Protocol for Mobile Networks: Initial Route Constructions Phase*, ACM/I. 1, No. 4, 1995, pp. 1–39.

(Continued)

*Primary Examiner*—Alpus H. Hsu
*Assistant Examiner*—Justin M. Philpott
(74) *Attorney, Agent, or Firm*—Allen, Dyer, Doppelt, Milbrath & Gilchrist, P.A.

(57) ABSTRACT

The mobile ad-hoc network includes a plurality of mobile nodes connected together by a plurality of wireless communication links. The method and system for monitoring link quality includes, at each node, recording transmission information for transmissions on links to neighboring nodes, calculating a packet error rate for each of the links to the neighboring nodes based upon the recorded transmission information, and determining link quality for each of the links to the neighboring nodes based upon the calculated packet error rate. The transmission information preferably includes packet size transmitted data, packet size received data, collision data and/or retry data.

33 Claims, 3 Drawing Sheets

OTHER PUBLICATIONS

Xiao et al., *A Flexible Quality of Service Model for Mobile Ad Hoc Networks,* IEEE VTC2000–spring, Tokyo, Japan, May 2000.

Wu et al., *QoS Support in Mobile Ad Hoc Networks,* Computing Science Department, University of Alberta, no date available.

Corson et al., *Mobile Ad Hoc Networking (MANET): Routing Protocol Performance Issues and Evaluation Considerations,* Network Working Group, Internet Engineering Task Force (IETF) MANET Working Group, Internet Draft, Jan. 1999.

Haas et al., *The Bordercast Resolution Protocol (BRP) for Ad Hoc Networks,* Internet Engineering Task Force (IETF) MANET Working Group, Internet Draft, Jun. 2001.

Haas et al., *The Interzone Routing Protocol (IERP)for Ad Hoc Networks,* Internet Engineering Task Force (IETF) MANET Working Group, Internet Draft, Jun. 2001.

Haas et al., *The Intrazone Routing Protocol* (IERP) for Ad Hoc Networks, Internet Engineering Task Force (IETF) MANET Working Group, Internet Draft, Jun. 2001.

Clausen et al. *Optimized Link State Routing Protocol,* Internet Engineering Task Force (IETF) MANET Working Group, Internet Draft, Oct. 31, 2001.

Perkins et al., *Quality of Service in Ad Hoc On–Demand Distance Vector Routing,* Internet Engineering Task Force (IETF) MANET Working Group, Internet Draft, Jul. 2000.

Park et al., *Temporally–Ordered Routing Algorithm (TORA) Versoin 1 Functional Specification,* Internet Engineering Task Force (IETF) MANET Working Group, Internet Draft, Jul. 20, 2001.

Ogier et al., *Topology Broadcast Based on Reserve–Path Forwarding (TBRPF),* Internet Engineering Task Force (IETF) MANET Working Group, Internet Draft, Jan. 10, 2002.

Gerla et al., *Landmark Routing Protocol (LANMAR) for Large Scale Ad Hoc Networks,* Internet Engineering Task Force (IETF) MANET Working Group, Internet Draft, Dec. 17, 2001.

Hu et al., *Flow State in the Dynamic Socurce Routing Protocol for Mobile Ad Hoc Networks,* Internet Engineering Task Force (IETF) MANET Working Group, Internet Draft, Feb. 23, 2001.

Gerla et al., *Fisheye State Routing Protocol (FSR) for Ad Hoc Networks,* Internet Engineering Task Force (IETF) MANET Working Group, Internet Draft, Dec. 17, 2001.

Johnson et al., *The Dynamic Source Routing Protocol for Mobile Ad Hoc Networks (DSR),* Internet Engineering Task Force (IETF) MANET Working Group, Internet Draft, Nov. 21, 2001.

Perkins et al.,*Ad hoc On–Demand Distance Vector (ADOV) Routing,* Internet Engineering Task Force (IETF) MANET Working Group, Internet Draft, Nov. 9, 2001.

Chakrabarti et al., "*QoS Issues in Ad Hoc Wireless Networks*", , IEEE Communications Magazine, (Feb. 2001), pp. 142–148.

Chen, "*Routing Support for Providing Guaranteed End–to–End Quality–of–Service,*" Ph.D. thesis, Univ. of Illinois at Urbana–Champaign, http://cairo.cs.uiuc.edu/papers/Scthesis.ps. 1999.

\* cited by examiner

MONITORING LINK QUALITY IN A MOBILE AD HOC NETWORK

FIELD OF THE INVENTION

The present invention relates to the field of communication networks, and, more particularly, to mobile ad hoc wireless networks and related methods.

BACKGROUND OF THE INVENTION

A rapidly developing area of wireless networks is mobile ad hoc networks. Physically, a mobile ad hoc network includes a number of geographically-distributed, potentially mobile nodes wirelessly connected by one or more radio frequency channels. Compared with other type of networks, such as cellular networks or satellite networks, the most distinctive feature of mobile ad hoc networks is the lack of any fixed infrastructure. The network is formed of mobile nodes only, and a network is created on the fly as the nodes transmit to or receive from other nodes. The network does not in general depend on a particular node and dynamically adjusts as some nodes join or others leave the network.

An ad hoc network can be quickly deployed and provide much needed communications. Ad hoc networks will allow people to exchange data in the field or in a class room without using any network structure except the one they create by simply turning on their computers or PDAs, for example.

New applications for mobile ad hoc networks will continue to emerge and become an important part of the communication structure. Due to the lack of a fixed infrastructure, nodes must self-organize and reconfigure as they move, join or leave the network. All nodes could potentially be functionally identical and there may not be any natural hierarchy or central controller in the network. Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

A routing protocol needs to adapt to frequent topology changes and with less accurate information. Because of these unique requirements, routing in these networks is very different from others. Gathering fresh information about the entire network is often costly and impractical. Many routing protocols are reactive (on-demand) protocols: they collect routing information only when necessary and to destinations they need routes to, and do not generally maintain unused routes after some period of time. This way the routing overhead is greatly reduced compared to pro-active protocols which maintain routes to all destinations at all times. It is important for a protocol to be adaptive. Ad Hoc on Demand Distance Vector (AODV), Dynamic Source Routing (DSR) and Temporally Ordered Routing Algorithm (TORA) are representative of on-demand routing protocols presented at the MANET working group.

Examples of other various routing protocols include Destination-Sequenced Distance Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both proactive and reactive approaches based upon distance from a source node.

These conventional routing protocols use a best effort approach in selecting a route from the source node to the destination node. Typically, the number of hops is the main criteria (metric) in such a best effort approach. In other words, the route with the least amount of hops is selected as the transmission route. Quality-of-service (QoS) routing in mobile ad hoc networks is gaining interest. To provide quality-of-service, the protocol needs not only to find a route but also to secure the resources along the route. Because of the limited, shared bandwidth of the network, and lack of central controller which can account for and control these limited resources, nodes must negotiate with each other to manage the resources required for QoS routes. This is further complicated by frequent topology changes. Due to these constraints, QoS routing is more demanding than best-effort routing.

Some examples of QoS routing approaches are set forth by Chenxi Zhu in the publication entitled "Medium Access Control and Quality-of-Service Routing for Mobile Ad Hoc Networks," 2001, and by M. Mirhakkak et al. in the publication entitled "Dynamic Quality-of-Service for Mobile Ad Hoc Networks," MITRE Corp., 2000. Zhu discusses establishing bandwidth guaranteed QoS routes in small networks whose topologies change at a low to medium rate. Mirhakkak et al. are concerned with resource reservation requests which specify a range of QoS values while the network makes a commitment to provide service within this range.

An area of concern with mobile ad-hoc networks is how to determine whether a link to another node is usable. In other words, the link performance or quality between certain nodes may have degraded but current mobile ad-hoc network protocols do not monitor such characteristics. Typical IEEE standard 802.11 wireless networks react to degraded link performance only in infrastructure mode when they no longer hear beacons. Also, routing protocols such as DSR rely on the MAC/PHY layer's criteria for a failed link.

SUMMARY OF THE INVENTION

In view of the foregoing background, it is therefore an object of the present invention to more accurately measure link quality in a mobile ad-hoc network.

This and other objects, features, and advantages in accordance with the present invention are provided by a method for monitoring link quality in a mobile ad hoc network. The mobile ad-hoc network includes a plurality of mobile nodes connected together by a plurality of wireless communication links. The method comprises, at each node, recording transmission information for transmissions on links to neighboring nodes, calculating a packet error rate for each of the links to the neighboring nodes based upon the recorded transmission information, and determining link quality for each of the links to the neighboring nodes based upon the calculated packet error rate. The transmission information preferably includes packet size transmitted data, packet size received data, collision data and/or retry data.

The link quality for each of the links to the neighboring nodes may be compared with a threshold, and new route discovery and/or new channel discovery may be performed based upon the determined link quality. The packet error rate is preferably calculated for each of the links based upon a transmitted packet error rate for packets transmitted to the neighboring node over a time period, a received packet error rate for packets transmitted from the neighboring node over the time period, and an aggregate packet error rate for all neighbors over the time period. The packet error rate (PER) may be calculated for each of the links as $PER=a*(PER_{AB}+PER_{BA})/2+b*PER_{AGG}$, where a and b are weighting coefficients that combined equal 1. $PER_{AB}$ is the transmitted packet error rate for packets transmitted to the neighboring node over the time period. $PER_{BA}$ is the received packet error rate for packets transmitted from the neighboring node over the time period. $PER_{AGG}$ is the aggregate packet rate for neighbors over the time period.

The transmitted packet error rate may be a ratio of the amount of bytes acknowledged as received by the neighboring node with respect to the amount of bytes transmitted to the neighboring node. The received packet error rate may be a ratio of the number of bytes (or packets) received in error to the number of bytes (or packets) transmitted by the neighboring node. Furthermore, the aggregate packet error rate may based upon contiguous and non-contiguous sequence numbers of transmitted packets.

Objects, features, and advantages in accordance with the present invention are also provided by a mobile ad hoc network including a plurality of mobile nodes and a plurality of wireless communication links connecting the plurality of mobile nodes together. Each mobile node comprises a communications device to wirelessly communicate with other nodes of the plurality of nodes via the wireless communication links, and a controller to route communications via the communications device. The controller includes a transmission information recorder to record transmission information for transmissions on links to neighboring nodes, a packet error rate calculator to calculate a packet error rate for each of the links to the neighboring nodes based upon the recorded transmission information, and a link quality determining unit to determine link quality for each of the links to the neighboring nodes based upon the calculated packet error rate.

Again, the transmission information preferably includes packet size transmitted data, packet size received data, collision data and/or retry data. The controller may also include a route discovery unit to perform new route discovery based upon the determined link quality, and/or a channel scouting unit to perform new channel discovery based upon the determined link quality. The packet error rate calculator calculates the packet error rate for each of the links based upon a transmitted packet error rate for packets transmitted to the neighboring node over a time period, a received packet error rate for packets transmitted from the neighboring node over the time period, and an aggregate packet error rate for all neighbors over the time period. The packet error rate (PER) may be calculated for each of the links as $PER=a*(PER_{AB}+PER_{BA})/2+b*PER_{AGG}$, where a and b are weighting coefficients that combined equal 1. $PER_{AB}$ is the transmitted packet error rate for packets transmitted to the neighboring node over the time period, $PER_{BA}$ is the received packet error rate for packets transmitted from the neighboring node over the time period, and $PER_{AGG}$ is the aggregate packet rate for neighbors over the time period. The transmitted packet error rate is preferably a ratio of the amount of bytes acknowledged as received by the neighboring node with respect to the amount of bytes transmitted to the neighboring node. Likewise, the received packet error rate may be a ratio of the number of bytes (or packets) received in error to the number of bytes (or packets) transmitted by the neighboring node. Also, the aggregate packet error rate may be based upon contiguous and noncontiguous sequence numbers of transmitted packets.

DETAILED DESCRIPTION OF THE PREFERRED EMBODIMENTS

Figure 1:
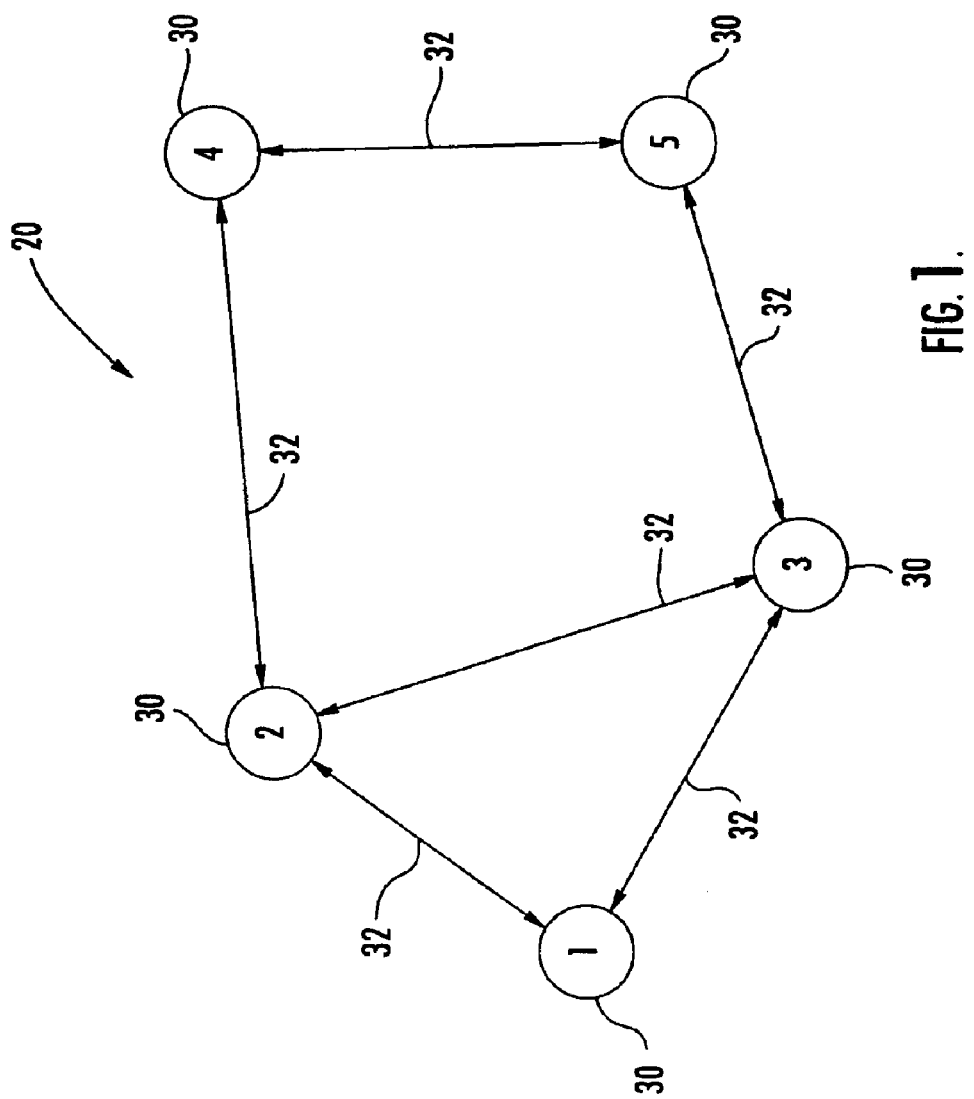
FIG. 1 is a schematic diagram of a mobile ad hoc network in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring initially to FIGS. 1–5, a method for monitoring link quality in a mobile ad hoc network 20 will now be described. The network 20 includes a plurality of mobile nodes 30 including the source node 1 and the destination node 4 with intermediate nodes 2, 3 and 5 therebetween. The nodes 30, such as laptop computers, personal digital assistants (PDAs) or mobile phones, are connected by wireless communication links 32 as would be appreciated by the skilled artisan. Many routing protocols are reactive (on-demand) protocols: they collect routing information only when necessary and to destinations they need routes to, and do not generally maintain unused routes after some period of time. Other routing protocols are proactive which maintain routes to all destinations at all times. Furthermore, there are hybrid routing protocols such as ZRP. However, each of these types of routing protocols may create and maintain a table or cache of routes to many destinations even if for only a limited period of time.

A typical reactive routing approach includes transmitting a route request RREQ from the source node 1 to discover routing to the destination node 4. More specifically, when a new route is needed to a given destination node 4, the source node 1 broadcasts the RREQ packet to the destination node. Such RREQ packets are used in routing protocols such as DSR or AODV. The conventional RREQ broadcast is used for "best effort" service. The method of the present invention may still follow the conventional procedures established by the protocol for best effort service.

Furthermore, the reactive routing approach typically includes each intermediate node 2, 3 and 5 determining whether the node can support the route request RREQ. If the node cannot support the particular request RREQ, then the request is denied or simply not forwarded by the node. If the node, for example node 3, can support the particular request RREQ, then the node forwards the route request to other intermediate nodes 2 and 5, and may temporarily reserve node resources for that route request. Intermediate nodes 2 and 5 also must determine whether they can support the route request RREQ forwarded from node 3. If so, the route request RREQ is then forwarded to the destination node 4.

The destination node 4, upon receiving the route request RREQ, generates a reply RREP to the source node 1 for each discovered route. In other words, the destination node 4 may have received the forwarded route request RREQ from any of various possible routes including, for example, 1-2-4 or 1-3-5-4. A reply RREP is generated in each case. The source node 1 may then add the possible routes to a routing table or cache as discussed above. The source node 1 then selects a route to the destination node 4, and the source node may transmit route confirmations CONF to intermediate nodes on the selected route. This is to confirm the use of the resources on the selected route in a system using a routing approach other than a best effort approach, such as quality of service (QoS) routing.

Of course, the source node 1 then transmits the message data to the destination node 4 along one of the plurality of discovered routes, such as routes 1-2-4 or 1-3-5-4, for example. Distributing the message data may include distributing duplicate message data along a plurality of discovered routes for improved reliability. As used herein, "message data" is intended to include any data that may be sent between nodes in the mobile ad-hoc network, including (but not limited to) video data, audio data, alphanumeric data, etc., as would be appreciated by the skilled artisan.

Also, the intermediate nodes 2, 3 and 5, and/or the destination node 4, may detect whether the node can continue to support the route request RREQ. If the node cannot continue to support the request RREQ, then the node may generate an error notification RERR to the source node 1. The source node 1 may purge the failed route from the route table, upon receiving the error notification RERR, while maintaining the use of the other discovered routes. However, if necessary, the source node 1 may again transmit a route request RREQ to discover new routing to the destination node 4.

In the above described reactive routing scheme, or in conventional proactive or hybrid routing schemes, the nodes react to a failed or degraded link when they can no longer hear beacons. However, there is no intelligent way to determine if a link is still usable or meets a certain quality threshold.

Thus, the method of the present invention begins at block 100 (FIG. 2) and includes, at one or more nodes 30, recording transmission information for transmissions on links to neighboring nodes (block 102). The transmission information preferably includes data regarding packet size transmitted, packet size received, collisions and/or retries. Such information would be stored in a table or cache, and would be continuously or periodically updated. Then, the method continues at block 104 by calculating a packet error rate (PER) for each of the links 32 to the neighboring nodes 30 based upon the recorded transmission information.

The packet error rate is preferably calculated for each of the links 32 based upon a transmitted packet error rate for packets transmitted to a neighboring node over a time period, a received packet error rate for packets transmitted from the neighboring node over the time period, and an aggregate packet error rate for all neighbors over the time period. The packet error rate (PER) may be calculated for each of the links 32 as $PER = a*(PER_{AB}+PER_{BA})/2 + b*PER_{AGG}$, where a and b are weighting coefficients that combined equal 1. $PER_{AB}$ is the transmitted packet error rate for packets transmitted to the neighboring node over the time period. $PER_{BA}$ is the received packet error rate for packets transmitted from the neighboring node over the time period. $PER_{AGG}$ is the aggregate packet error rate for for all neighbors over the time period.

The transmitted packet error rate may be a ratio of the amount of bytes acknowledged as received by the neighboring node with respect to the amount of bytes transmitted to the neighboring node. The received packet error rate may be a ratio of the number of bytes (or packets) received in error to the number of bytes (or packets) transmitted by the neighboring node. Furthermore, the aggregate packet error rate may be based upon contiguous and non-contiguous sequence numbers of transmitted packets.

At block 106, the method includes determining link quality for each of the links 32 to the neighboring nodes based upon the calculated packet error rate. The link quality for each of the links 32 to the neighboring nodes may be compared with a threshold (block 108), and new route discovery and/or new channel discovery may be performed based upon the determined link quality (block 110).

The described method can be applied to any type of On-Demand or Reactive routing protocol, such as Dynamic Source Routing (DSR) or Ad-Hoc On-Demand Distance Vector (AODV) routing, to any proactive routing protocol, such as Destination Sequenced Distance-Vector (DSDV) routing, or to any hybrid proactive/reactive protocol, such as Zone Routing Protocol (ZRP), as would be appreciated by the skilled artisan.

Referring now additionally to FIGS. 6 and 7, a system aspect of the invention will be described. As discussed, the mobile ad hoc network 20 includes a plurality of mobile nodes 30, and a plurality of wireless communication links 32 connecting the plurality of mobile nodes together. Each mobile node includes a router 40 (FIG. 3) that has a communications device 42 to wirelessly and uni-directionally or bi-directionally communicate with other nodes via the wireless communication links 32, and a controller 44 to route communications via the communications device 42. Also, a memory 46 may be included as part of the controller 44 or in connection with the controller.

Figure 4:
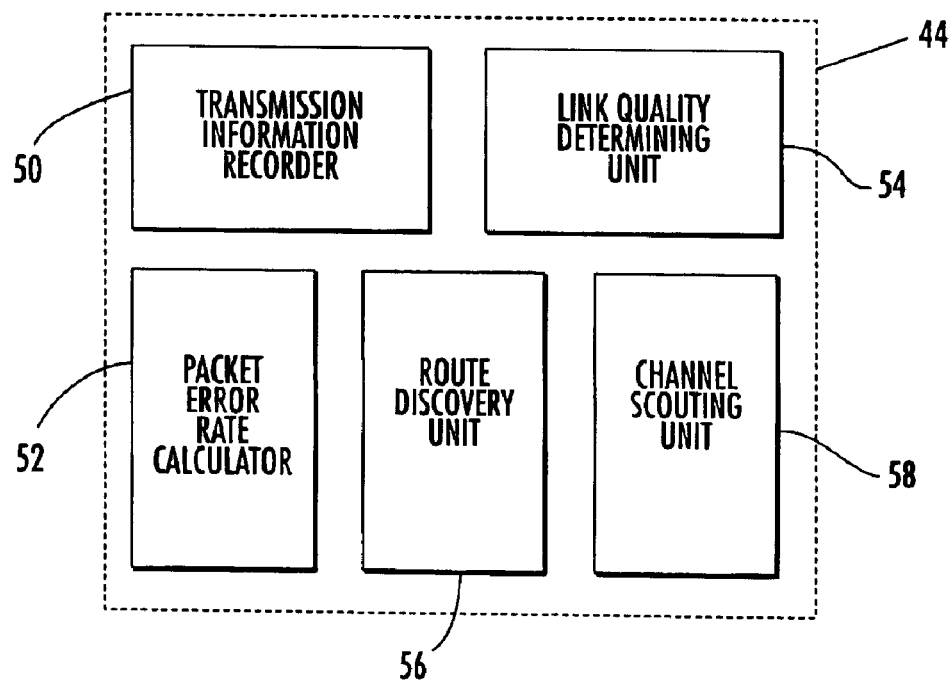
FIG. 4 is a schematic diagram illustrating the details of the controller of the router in FIG. 3.

As shown in FIG. 4, the controller 44 at least includes a transmission information recorder 50 to record transmission information for transmissions on links 32 to neighboring nodes 30. Again, the transmission information preferably includes packet size transmitted data, packet size received data, collision data and/or retry data. The controller 44 also includes a packet error rate calculator 52 to calculate a packet error rate for each of the links to the neighboring nodes based upon the recorded transmission information. The packet error rate calculator 52 calculates the packet error rate for each of the links 32 based upon a transmitted packet error rate for packets transmitted to the neighboring node over a time period, a received packet error rate for packets transmitted from the neighboring node over the time period, and an aggregate packet error rate for all neighbors over the time period. As discussed above, the packet error rate (PER) may be calculated for each of the links as $PER = a*(PER_{AB}+PER_{BA})/2 + b*PER_{AGG}$, where a and b are weighting coefficients that combined equal 1.

$PER_{AB}$ is the transmitted packet error rate for packets transmitted to the neighboring node over the time period, $PER_{BA}$ is the received packet error rate for packets transmitted from the neighboring node over the time period, and $PER_{AGG}$ is the aggregate packet error rate for all neighbors over the time period. The transmitted packet error rate is preferably a ratio of the amount of bytes acknowledged as received by the neighboring node with respect to the amount of bytes transmitted to the neighboring node. Likewise, the received packet error rate may be a ratio of the number of bytes (or packets) received in error to the number of bytes (or packets) transmitted by the neighboring node. Also, the aggregate packet error rate may be based upon contiguous and non-contiguous sequence numbers of transmitted packets. Such non-contiguous sequence numbers would imply lost packets.

Also, the controller 44 includes and a link quality determining unit 54 to determine link quality for each of the links to the neighboring nodes based upon the calculated packet error rate. The controller 44 may also include a route discovery unit 56 to perform new route discovery based upon the determined link quality, and/or a channel scouting unit 58 to perform new channel discovery based upon the determined link quality.

The present invention may make use of dynamic channel allocation in a mobile ad hoc network to efficiently make use of a plurality of available channels, as described in copending application Ser. No. 10/134,862 (Atty. Docket No. 51261), filed Apr. 29, 2002 by the same assignee of record and incorporated by reference herein in its entirety. As is discussed, IEEE 802.11 spinoffs like 802.11a will make use of the ISM spectrum in the 5 GHz band. In this band, there is more bandwidth available to support many channels. As a result, a process to automatically assign a channel to an 802.11 node would be important. Such a channel decision would be based on current channel utilization and sampling of the other channels. Using dynamic channel selection would provide better performance since the spectrum would be used evenly. Additionally, channel use could be throttled such that a predetermined link quality is maintained for current nodes/stations using the channel.

In sum, according to the present invention, a node monitors the performance of the link to another node by determining link quality in view of packet error rate (PER), delay, contention, etc. If link quality falls below a threshold, the node should seek out another route (or another channel). For each next hop, the invention records, for example: packet size transmitted, packet size received, collision counts and retry counts.

Then, the PER is predicted for each next hop as: $PER = a*(PER_{AB}+PER_{BA})/2 + b*PER_{AGG}$ where a and b are weights that sum to 1, $PER_{AB}$ is the PER for packets transmitted to node B from node A over time T, and $PER_{BA}$ is the PER for packets transmitted from node B to node A over time T. $PER_{AGG}$ is the aggregate PER for the all neighbors over time T.

$PER_{AB}$ may be computed by tracking the number of bytes acknowledged, divided by total number of bytes transmitted to B, but not counting collisions in the calculation, since collisions are not a link quality phenomena per se. If node 1 sends an Acknowledgment to node 2, but we receive a retry from node 2, that means the Acknowledgment from node 1 failed.

$PER_{AB}$ may also be computed by using a received signal to noise ratio (S/N) and converting to the ratio of energy per bit to noise power spectral density (Eb/No) to arrive at a bit error rate (BER) for that modulation type, then computing the mean number of errored bits. Data rate and modulation type may vary during segments of the packet.

$PER_{AGG}$ preferably involves recording stats on all transmissions. For example, non-contiguous sequence numbers imply lost packets. The average size of a transmission or a correctly received retransmission may be used for PER calculation purposes. The coefficients a and b may be weighted such that $PER_{AGG}$ is used predominantly when there is little or no history on $PER_{AB}$ and $PER_{BA}$. Also, the coefficients a and b may be weighted such that $PER_{AGG}$ is used to a lesser degree when there is an abundant history on $PER_{AB}$ and $PER_{BA}$.

Current MANET algorithms rely on standard MAC/PHY error criteria, which aren't built with MANETs in mind. The present invention uses more information to more accurately measure link quality. This will help detect bad links sooner, and avoid giving up on good link that had bad luck.

The disclosure of related application entitled "MULTI-CHANNEL MOBILE AD HOC NETWORK" (atty. Docket No. 51283) to the same assignee and concurrently filed herewith is incorporated by reference herein in its entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for monitoring link quality in a mobile ad hoc network comprising a plurality of mobile nodes connected together by a plurality of wireless communication links, the method comprising at each node:
   recording transmission information for transmissions on links to neighboring nodes;
   calculating a packet error rate for each of the links to the neighboring nodes based upon the recorded transmission information;
   the packet error rate being calculated for each of the links based upon a weighted sum of (a) an aggregate packet error rate for neighboring nodes over a time period, and (b) at least one of a transmitted packet error rate for packets transmitted to the neighboring node over the time period and a received packet error rate for packets transmitted from the neighboring node over the time period;
   determining link quality for each of the links to the neighboring nodes based upon the calculated packet error rate;
   comparing the link quality for each of the links to the neighboring nodes with a threshold; and
   performing new channel discovery when link quality falls below the threshold.

2. The method according to claim 1 wherein the transmission information includes one or more of packet size transmitted data, packet size received data, collision data and retry data.

3. The method according to claim 1 wherein the packet error rate is calculated for each of the links based upon a transmitted packet error rate for packets transmitted to the neighboring node over a time period, a received packet error rate for packets transmitted from the neighboring node over the time period, and an aggregate packet error rate for neighboring nodes over the time period.

4. The method according to claim 3 wherein the packet error rate (PER) is calculated for each of the links as $PER = a*(PER_{AB}+PER_{BA})/2 + b*PER_{AGG}$, where a and b are weighting coefficients that combined equal 1, $PER_{AB}$ is the transmitted packet error rate for packets transmitted to the neighboring node over the time period, $PER_{BA}$ is the received packet error rate for packets transmitted from the neighboring node over the time period, and $PER_{AGG}$ is the aggregate packet error rate for neighboring nodes over the time period.

5. The method according to claim 4 wherein the transmitted packet error rate is a ratio of the amount of bytes acknowledged as received by the neighboring node with respect to the amount of bytes transmitted to the neighboring node.

6. The method according to claim 4 wherein the received packet error rate is a ratio of the amount of bytes received in error with respect to the amount of bytes transmitted by the neighboring node.

7. The method according to claim 4 wherein the aggregate packet error rate is based upon contiguous and non-contiguous sequence numbers of transmitted packets.

8. A method for monitoring link quality in a mobile ad hoc network comprising a plurality of mobile nodes connected together by a plurality of wireless communication links, the method comprising at each node:
   recording transmission information for transmissions on links to neighboring nodes, transmission information including at least one of packet size transmitted data, packet size received data, collision data and retry data;
   calculating a packet error rate for each of the links to the neighboring nodes based upon the recorded transmission information;
   the packet error rate being calculated for each of the links based upon a weighted sum of (a) an aggregate packet error rate for neighboring nodes over a time period, and (b) at least one of a transmitted packet error rate for packets transmitted to the neighboring node over the time period and a received packet error rate for packet transmitted from the neighboring node over the time period; and
   determining link quality for each of the links to the neighboring nodes based upon the calculated packet error rate.

9. The method according to claim 8 further comprising performing new route discovery based upon the determined link quality.

10. The method according to claim 8 further comprising performing new channel discovery based upon the determined link quality.

11. The method according to claim 8 wherein the packet error rate is calculated for each of the links based upon a transmitted packet error rate for packets transmitted to the neighboring node over a time period, a received packet error rate for packets transmitted from the neighboring node over the time period, and an aggregate packet error rate for neighboring nodes over the time period.

12. The method according to claim 11 wherein the packet error rate (PER) is calculated for each of the links as $PER = a*(PER_{AB}+PER_{BA})/2 + b*PER_{AGG}$, where a and b are weighting coefficients that combined equal 1, $PER_{AB}$ is the transmitted packet error rate for packets transmitted to the neighboring node over the time period, $PER_{BA}$ is the received packet error rate for packets transmitted from the neighboring node over the time period, and $PER_{AGG}$ is the aggregate packet error rate for neighboring nodes over the time period.

13. The method according to claim 11 wherein the transmitted packet error rate is a ratio of the amount of bytes acknowledged as received by the neighboring node with respect to the amount of bytes transmitted to the neighboring node.

14. The method according to claim 11 wherein the received packet error rate is a ratio of the amount of bytes received in error with respect to the amount of bytes transmitted by the neighboring node.

15. The method according to claim 11 wherein the aggregate packet error rate is based upon contiguous and non-contiguous sequence numbers of transmitted packets.

16. A mobile ad hoc network comprising:
   a plurality of mobile nodes; and
   a plurality of wireless communication links connecting the plurality of mobile nodes together;
   each mobile node comprising
   a communications device to wirelessly communicate with other nodes of the plurality of nodes via the wireless communication links, and
   a controller to route communications via the communications device, and comprising:
      a transmission information recorder to record transmission information for transmissions on links to neighboring nodes;
      a packet error rate calculator to calculate a packet error rate for each of the links to the neighboring nodes based upon the recorded transmission information; and said packet error rate calculator calculating the packet error rate for each of the links based upon a weighted sum of (a) an aggregated packet error rate for neighboring nodes over a time period, and (b) at least one of a transmitted packet error rate for packet transmitted to the neighboring node over the time period and a received packet error rate for packets transmitted from the neighboring node over the time period;

a link quality determining unit to determine link quality for each of the links to the neighboring nodes based upon the calculated packet error rate.

17. The network according to claim 16 wherein transmission information includes at least one of packet size transmitted data, packet size received data, collision data and retry data.

18. The network according to claim 16 wherein the controller further comprises a route discovery unit to perform new route discovery based upon the determined link quality.

19. The network according to claim 16 wherein the controller further comprises a channel scouting unit to perform new channel discovery based upon the determined link quality.

20. The network according to claim 16 wherein the packet error rate calculator calculates the packet error rate for each of the links based upon a transmitted packet error rate for packets transmitted to the neighboring node over a time period, a received packet error rate for packets transmitted from the neighboring node over the time period, and an aggregate packet error rate for neighboring nodes over the time period.

21. The network according to claim 20 wherein the packet error rate (PER) is calculated for each of the links as $PER=a*(PER_{AB}+PER_{BA})/2+b*PER_{AGG}$, where a and b are weighting coefficients that combined equal 1, $PER_{AB}$ is the transmitted packet error rate for packets transmitted to the neighboring node over the time period, $PER_{BA}$ is the received packet error rate for packets transmitted from the neighboring node over the time period, and $PER_{AGG}$ is the aggregate packet error rate for neighboring nodes over the time period.

22. The network according to claim 20 wherein the transmitted packet error rate is a ratio of the amount of bytes acknowledged as received by the neighboring node with respect to the amount of bytes transmitted to the neighboring node.

23. The network according to claim 20 wherein the received packet error rate is a ratio of the amount of bytes received in error with respect to the amount of bytes transmitted by the neighboring node.

24. The network according to claim 20 wherein the aggregate packet error rate is based upon contiguous and non-contiguous sequence numbers of transmitted packets.

25. A mobile node for a mobile ad hoc network comprising a plurality of mobile nodes and a plurality of wireless communication links connecting the plurality of mobile nodes together, the mobile node comprising:

a communications device to wirelessly communicate with other nodes of the plurality of nodes via the wireless communication links, and a controller to route communications via the communications device, and comprising a transmission information recorder to record transmission information for transmissions on links to neighboring nodes;

a packet error rate calculator to calculate a packet error rate for each of the links to the neighboring nodes based upon the recorded transmission information;

said packet error rate calculator calculating the packet error rate for each of the links based upon a weighted sum of (a) an aggregate packet error rate for neighboring nodes over a time period, and (b) at least one of a transmitted packet error rate for packets transmitted to the neighboring node over the time period and a receiver packet error rate for packets transmitted from the neighboring node over the time period; and a link quality determining unit to determine link quality for each of the links to the neighboring nodes based upon the calculated packet error rate.

26. The mobile node according to claim 25 wherein transmission information includes at least one of packet size transmitted data, packet size received data, collision data and retry data.

27. The mobile node according to claim 25 wherein the controller further comprises a route discovery unit to perform new route discovery based upon the determined link quality.

28. The mobile node according to claim 25 wherein the controller further comprises a channel scouting unit to perform new channel discovery based upon the determined link quality.

29. The mobile node according to claim 25 wherein the packet error rate calculator calculates the packet error rate for each of the links based upon a transmitted packet error rate for packets transmitted to the neighboring node over a time period, a received packet error rate for packets transmitted from the neighboring node over the time period, and an aggregate packet error rate for neighboring nodes over the time period.

30. The mobile node according to claim 29 wherein the packet error rate (PER) is calculated for each of the links as $PER=a*(PER_{AB}+PER_{BA})/2+b*PER_{AGG}$, where a and b are weighting coefficients that combined equal 1, $PER_{AB}$ is the transmitted packet error rate for packets transmitted to the neighboring node over the time period, $PER_{BA}$ is the received packet error rate for packets transmitted from the neighboring node over the time period, and $PER_{AGG}$ is the aggregate packet error rate for neighboring nodes over the time period.

31. The mobile node according to claim 29 wherein the transmitted packet error rate is a ratio of the amount of bytes acknowledged as received by the neighboring node with respect to the amount of bytes transmitted to the neighboring node.

32. The mobile node according to claim 29 wherein the received packet error rate is a ratio of the amount of bytes received in error with respect to the amount of bytes transmitted by the neighboring node.

33. The mobile node according to claim 29 wherein the aggregate packet error rate is based upon contiguous and non-contiguous sequence numbers of transmitted packets.

* * * * *

UNITED STATES PATENT AND TRADEMARK OFFICE
CERTIFICATE OF CORRECTION

Figure 2:
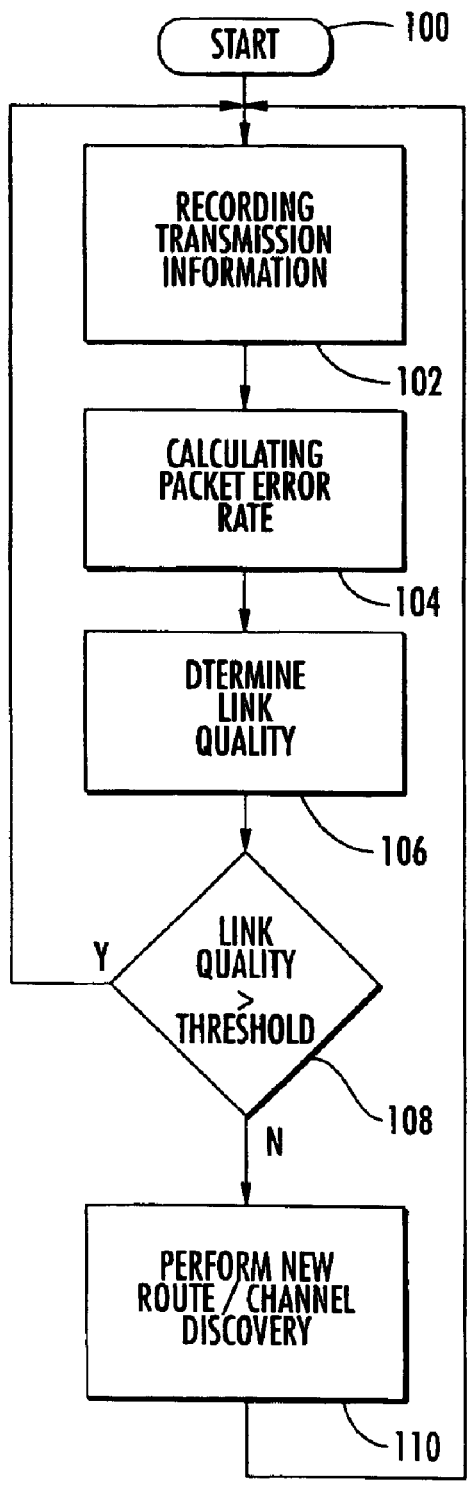
FIG. 2 is a flowchart illustrating the method steps for monitoring link quality in a mobile ad hoc network in accordance with the present invention.
Figure 3:
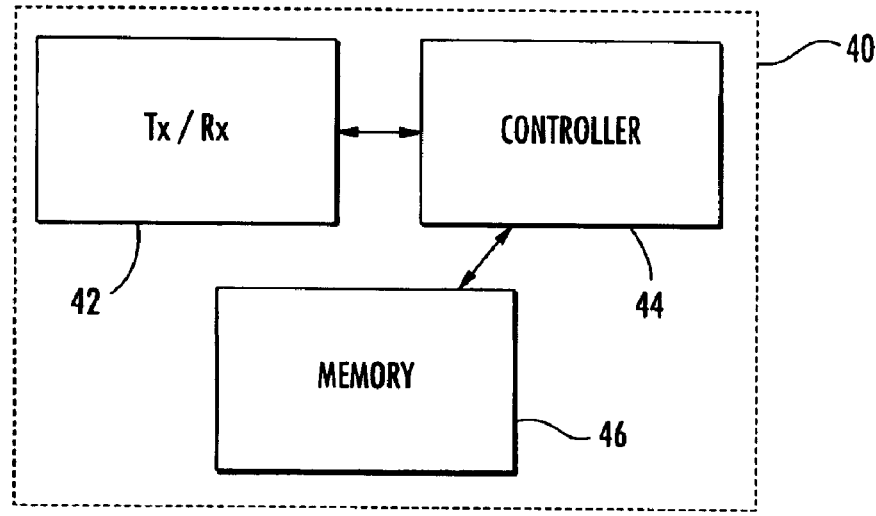
FIG. 3 is a schematic diagram illustrating a router of a node in accordance with the network of the present invention.

PATENT NO.   : 6,894,985 B2
DATED        : May 17, 2005
INVENTOR(S)  : Billhartz It is certified that error appears in the above-identified patent and that said Letters Patent is hereby corrected as shown below:

Drawings,
Delete FIG. 2 and insert new FIG. 2.

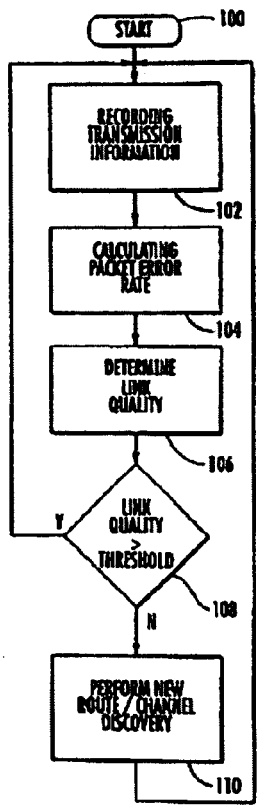

Signed and Sealed this

Eleventh Day of October, 2005

JON W. DUDAS
*Director of the United States Patent and Trademark Office*